United States Patent [19]

McDonald

[11] Patent Number: 4,603,273
[45] Date of Patent: Jul. 29, 1986

[54] DYNAMOELECTRIC MACHINE WITH EXTENDED CLEAT ASSEMBLY

[75] Inventor: George M. McDonald, Liberty Township, Hardin County, Ohio

[73] Assignee: Westinghouse Electric Corp., Pittsburgh, Pa.

[21] Appl. No.: 765,462

[22] Filed: Aug. 14, 1985

[51] Int. Cl.⁴ .............................................. H02K 5/00
[52] U.S. Cl. ........................................ 310/89; 310/90; 310/91; 310/217; 310/259
[58] Field of Search ...................... 310/89, 90, 91, 42, 310/71, 179, 180, 216, 217, 218, 254, 258, 259, 260; 174/50, 52 R; 29/598

[56] References Cited

U.S. PATENT DOCUMENTS

| | | |
|---|---|---|
| 3,209,434 | 10/1965 | Anderson, Jr. . |
| 3,256,590 | 6/1966 | Myers . |
| 3,714,705 | 2/1973 | Lewis . |
| 3,867,654 | 2/1975 | Otto . |
| 4,060,744 | 11/1977 | Starcevic ............................. 310/91 |
| 4,471,246 | 9/1984 | Paillet .................................... 310/90 |
| 4,480,378 | 11/1984 | White et al. . |
| 4,494,027 | 1/1985 | Otto ...................................... 310/90 |

FOREIGN PATENT DOCUMENTS 1020720 12/1957 Fed. Rep. of Germany ...... 310/217

Primary Examiner—R. Skudy
Attorney, Agent, or Firm—R. P. Lenart

[57] ABSTRACT

A dynamoelectric machine is provided with a laminated stator having a central opening for receiving a rotor and a plurality of longitudinal slots adjacent to its peripheral surface. Each of these longitudinal slots contains an extended cleat. The cleats extend beyond each end of the stator stack and are shaped to define a tab and shoulder on each end. A pair of end bells are positioned on opposite ends of the stator stack and each includes a central aperture in axial alignment with the central opening of the stator stack and a plurality of holes for receiving the extended cleat tabs. During assembly, an expandable arbor is positioned within the central opening and the end bell apertures to provide positive axial alignment between the end bells and the stator stack. Each end bell aperture has an initial diameter which is less than the diameter of the stator stack central opening. However expansion of the arbor resizes the end bell apertures so that their diameters become approximately equal to that of the central opening. The extended cleat tabs are then attached to the motor end bells, thereby securing the stator stack, cleats and end bells into a single unit.

7 Claims, 8 Drawing Figures

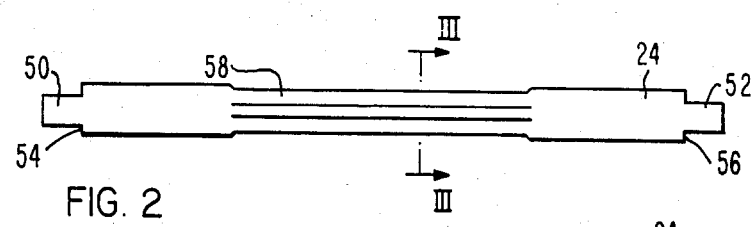
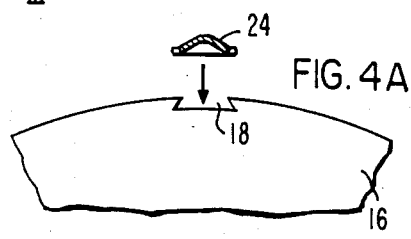
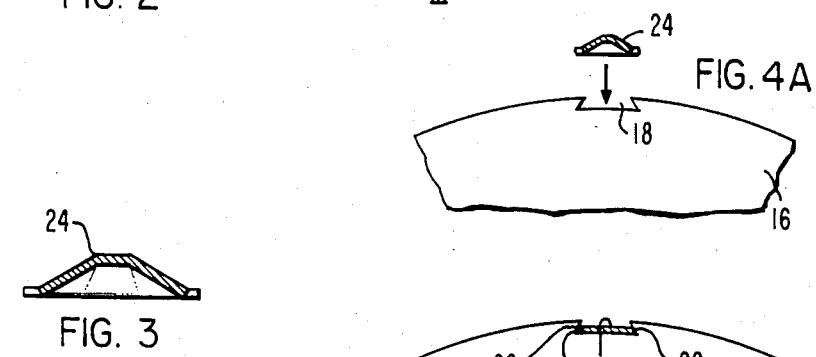
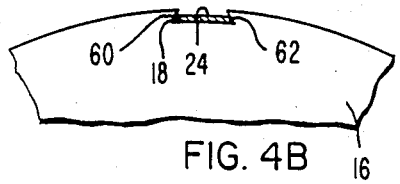
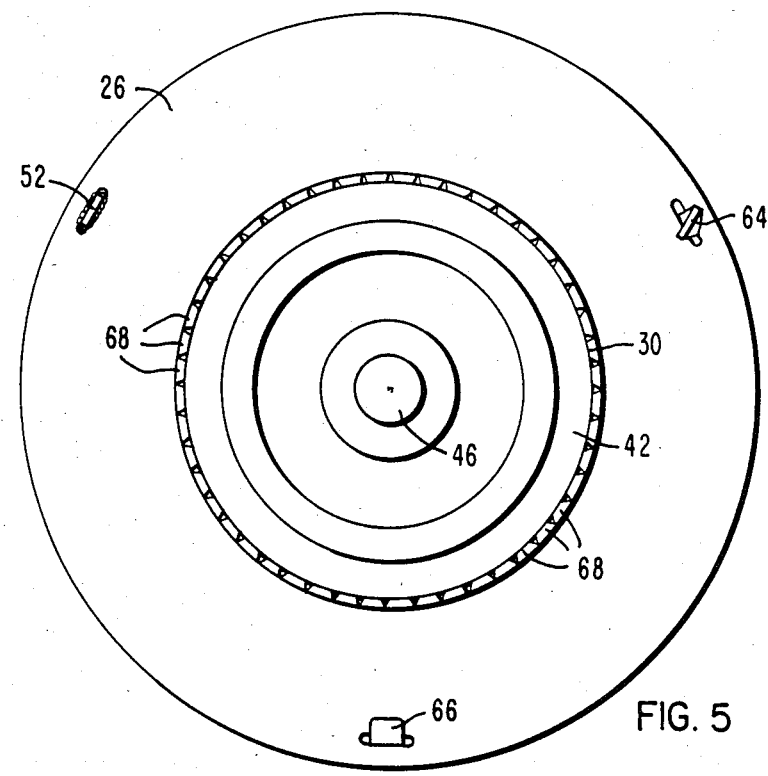

_(4,603,273)_

DYNAMOELECTRIC MACHINE WITH EXTENDED CLEAT ASSEMBLY

BACKGROUND OF THE INVENTION

This invention relates to dynamoelectric machines and more particularly to electric motors and methods of assembling the stationary members thereof.

Fractional horsepower electric motors commonly include a stator comprised of a plurality of stacked laminations and having a central opening for receiving a rotor. A pair of end frames or end bells are typically provided on opposite ends of the stator structure and serve to rotatably support the rotor.

Proper radial and axial alignment between the motor components must be maintained in order to provide for free rotation of the rotor, to prevent excessive eccentricity in the annular air gap between the rotor and the stator and to prevent excessive axial rotor thrust. Numerous means for securing motor end bells to the stator have been used. These means include through bolts, welding, lances between the frame and each end bell, gluing, etc. Each of these assembly systems does not compensate for varying frame lengths resulting from distortion in the stator stack thickness. Thus motor assemblies tend to vary slightly in overall length because of variations in the thickness of the elements used to construct the stator. Furthermore, these means for securing motor end bells are not readily adaptable to automatic assembly. It is therefore desirable to devise a motor assembly scheme which inherently compensates for varying frame lengths and distortion in stator thickness, while providing positive axial alignment of stator and end bell structures, and which is readily adaptable to automatic motor assembly.

SUMMARY OF THE INVENTION

Electric motors in which the stator comprises a plurality of stacked laminations have been known to use a cleat positioned within a longitudinal groove on an external surface of the stator stack to contain the laminations. Machines constructed in accordance with the present invention utilize cleats which extend beyond the ends of the stator stack and include tabs which are used to engage the motor end bells.

Dynamoelectric machines constructed in accordance with this invention comprise a plurality of laminations positioned adjacent to each other to form a stator stack having a central opening for receiving a rotor. A plurality of cleats are positioned in longitudinally extending grooves adjacent to an outer surface of the stator stack. The cleats extend beyond the stator stack ends and include a tab at each end. A pair of end bells are positioned on opposite sides of the stator stack and define a plurality of holes for receiving the cleat tabs. Means are provided for securing the tabs to the end bells. The extended cleats can be blanked to exact length so that when the end bells are secured to the cleat tabs, the machine length and squareness can be controlled more easily than with prior art assembly techniques.

The machines of the present invention are assembled by a method which begins with the step of stacking a plurality of stator laminations to form a stator stack having a central opening for receiving a rotor and having a plurality of longitudinal slots adjacent to the outer surface of the stack for receiving the extended cleats. The cleats are inserted radially into the slots and a pair of end bells are positioned on opposite sides of the stator stack. Each of these end bells defines an aperture having a diameter which is slightly smaller than the diameter of the central opening in the stator stack. An arbor is inserted through the end bell apertures and the central opening of the stator stack. The arbor is subsequently expanded so that its surface contacts the stator stack and the rims of the end bell apertures to provide positive axial alignment between the central opening and the end bell apertures. During expansion of the arbor, the rims of the end bell apertures deform so that the diameter of the apertures increases until it is approximately equal to the daimeter of the central opening in the stator structure. Tabs on the ends of the extended cleats are then attached to the end bells, thereby securing the stator stack, the cleats, and the end bells into a single unit.

BRIEF DESCRIPTION OF THE DRAWINGS

FIG. 2 is a plan view of an extended cleat used in the motor of FIG. 1;

FIG. 3 is a cross-section of the cleat of FIG. 2 taken along line III—III;

FIGS. 4A and 4B illustrate the insertion of the cleat of FIG. 2 into the stator stack of the motor of FIG. 1;

FIG. 5 is an end view of an alternative embodiment of the motor of FIG. 1;

DESCRIPTION OF THE PREFERRED EMBODIMENT

Figure 1:
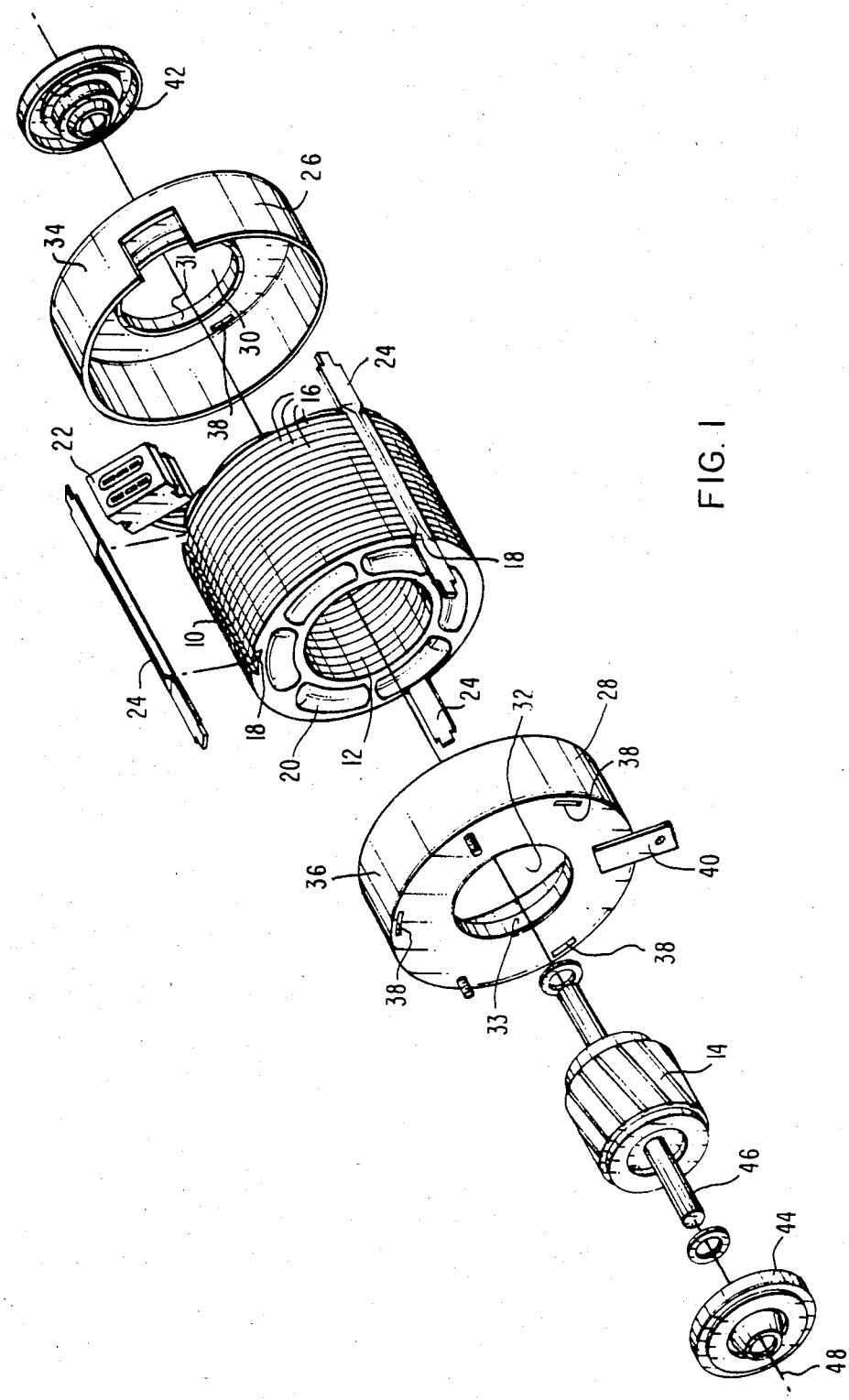
FIG. 1 is an exploded view of an electric motor constructed in accordance with one embodiment of the present invention.

Referring to the drawings, FIG. 1 is an exploded view of an electric motor constructed in accordance with one embodiment of the present invention. The motor includes a stator stack 10 having a central opening 12 for receiving a rotor 14. The stator stack is comprised of a plurality of laminations 16 each having a central hole and a plurality of peripheral cutouts. These laminations are stacked such that the central holes of the laminations form the central opening 12 in the stator stack and the peripheral cutouts in the laminations form longitudinally extending grooves 18 on the external surface of the stator stack 10.

A stator winding 20 passes through additional apertures in the stator laminations and is connected to an electrical connector 22. Extended cleats 24 each having a central portion which is positioned within one of the longitudinally extending grooves 18 of the stator stack 10. End bells 26 and 28 having central apertures 30 and 32 respectively are positioned on opposite ends of the stator stack. Deformable flanges, or rims, 31 and 33 extend inwardly from the perimeter of apertures 30 and 32 respectively. The initial diameter of apertures 30 and 32 is slightly smaller than the diameter of the central opening 12 in the stator stack. The end bells also include peripheral inwardly extending cylindrical flanges 34 and 36 which are sized to form a loose interference fit with the outside surface of the stator stack 10. A plurality of holes 38 for receiving tabs on the ends of the extended cleats pass through each of the end bells. Means for securing the motor to a support structure, not shown, such as mounting bracket 40 may also be attached to the end bells. A pair of bearing modules 42 and 44 are shaped to fit within apertures 30 and 32 of end bells 26 and 28 respectively, and serve to rotatably support rotor shaft 46 along central axis 48.

FIG. 2 is a plan view of one of the extended cleats 24 of the motor of FIG. 1. This cleat includes a pair of tabs 50 and 52 at opposite ends adjacent to shoulders 54 and 56. The central portion 58 of cleat 24 includes a longitudinal bend to reduce the width of the central portion and to permit easy radial insertion of the cleat into the longitudinal grooves in the stator stack. FIG. 3 is a cross-section of the cleat of FIG. 2 taken along line III—III and illustrates the longitudinal bend in cleat 24. FIGS. 4A and 4B illustrate the radial insertion of cleat 24 into slot 18 having a dovetail cross-section. Cleat 24 is flattened within slot 18 and makes contact with the angled sides 60 and 62 of slot 18 to pre ent subsequent radial movement of the cleat.

FIG. 5 is an end view of an alternate embodiment of the motor of FIG. 1 which illustrates various methods of securing the end tabs of the extended cleats to the end bell 26. In particular, tab 52 is shown to be welded to end bell 26, tab 4 is shown to be twisted to prevent longitudinal movement of the end bell and tab 66 is shown to be bent over. It should be understood that a practical design would most likely utilize only a single method of securing the tabs to the end bell, however, FIG. 5 illustrates that various securing means are envisioned within the scope of the invention.

FIG. 5 also illustrates an alternative end bell design wherein a plurality of fingers 68 lining aperture 30 have replaced the deformable flange 31 of end bell 26 in FIG. 1. These fingers are bent axially and radially during assembly of the motor and serve to hold bearing module 42 in place.

Figure 6:
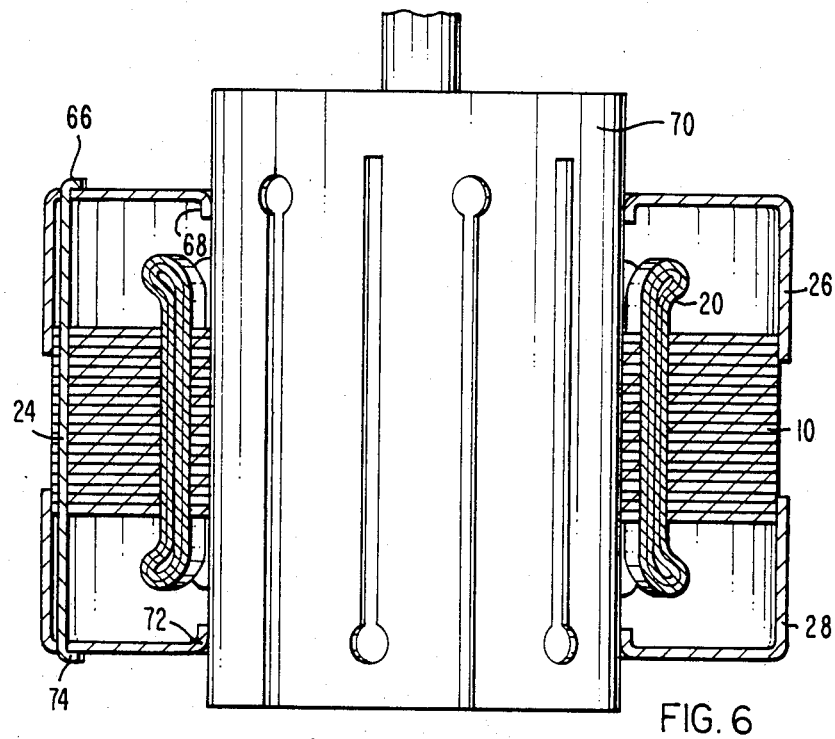
FIG. 6 is a cross-section of a motor being assembled in accordance with this invention.
Figure 7:
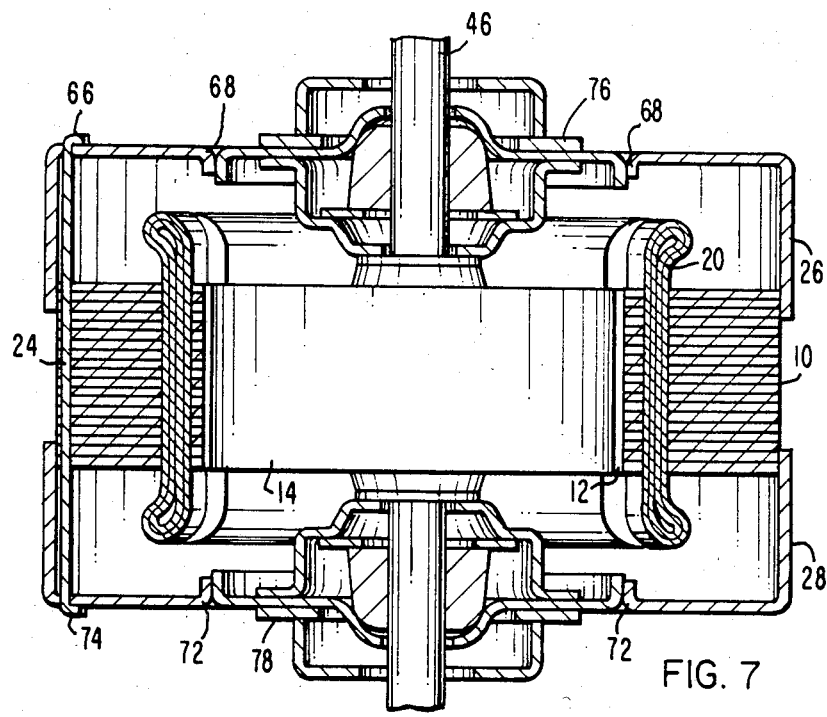
FIG. 7 is a cross-section of a motor assembled in accordance with the assembly step illustrated in FIG. 6.

The machines of the present invention are assembled by stacking a plurality of stator laminations, each having a central hole and a plurality of peripheral cut-outs, to form a stator stack having a central opening and a plurality of longitudinal slots on the periphery of the stack. An extended cleat is inserted radially into each of the slots such that the cleat extends longitudinally beyond each end of the stator stack and beyond the end turns of a field winding passing through the stator stack. The cleats include a longitudinal bend which reduces the initial width of a central portion of the cleats. This central portion of each cleat is flattened to make contact with the sides of the stator slots. A pair of end bells are positioned on opposite sides of the stator stack, so that the cleat tabs pass through holes in the end bells and each cleat shoulder makes contact with an internal surface of one of the end bells. Each end bell defines an aperture which is axially aligned with the central opening of the stator stack. An expandable arbor, 70 in FIG. 6, is inserted into the central opening and through the end bell aperture. The arbor is then expanded such that its surface contacts the interior surface of the stator stack and a plurality of fingers 68 and 72 in FIG. 6 which line the apertures of the end bells. These fingers are deformed by being bent axially inward and radially outward as illustrated in FIG. 6. If the end bells contain internal flanges such as 31 and 33 in FIG. 1, these flanges are deformed radially outward by the expansion of the arbor. In either case, this operation effectively resizes the end bell apertures so that they have diameters which are approximately equal to the diameter of the central opening of the stator stack. While the end bells and stator stack are held in axial alignment by the expandable arbor 70, the cleat end tabs, for example 66 and 74, are attached to the end bells, thereby securing the stator stack, the cleats and the end bells into a single unit. As illustrated in FIG. 7, the rotor 14 and bearing modules 76 and 78 are inserted such that the rotor 14 is positioned within the central opening 12 of the stator stack and the bearing modules 76 and 78 are positioned within the end bell apertures and held by fingers 68 and 72 respectively. If the end bells include internal flanges such as 31 and 33 in FIG. 1, the bearing modules would form an interference fit with these expanded flanges.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A dynamoelectric machine comprising:
   a plurality of laminations positioned adjacent to each other to form a stator stack having a central opening for receiving a rotor;
   a plurality of longitudinally extending grooves positioned at spaced locations adjacent to the outer surface of said stator stack;
   a plurality of cleats;
   each of said cleat passing through one of said grooves and extending beyond said stator stack;
   each of said cleats including a tab at each end and a shoulder adjacent to each of said tabs;
   a pair of end bells positioned on opposite sides of said stator stack and defining a plurality of holes for receiving said tabs;
   means for securing said tabs to said end bells wherein each of said shoulders abuts an internal surface of one of said end bells;
   a first bearing module in a first aperture in a first one of said end bells;
   a second bearing module in a second aperture in a second one of said end bells;
   a rotor having a shaft which passes through said first and second bearing modules;
   wherein said first end bell includes a first plurality fo fingers encompassing said first aperture and in frictional contact with said first bearing module; and
   wherein said second end bell includes a second plurality of fingers encompassing said second aperture and in frictional contact with said second bearing module.

2. A dynamoelectric machine as recited in claim 1, wherein said means for securing said tabs includes a bend in each of said tabs.

3. A dynamoelectric machine as recited in claim 1, wherein said means for securing said tabs includes a twist in a portion of each of said tabs which extends through one of said holes in one of said end bells.

4. A dynamoelectric machine as recited in claim 1, wherein said means for securing said tabs includes a weld between each of said tabs and one of said end bells.

5. A dynamoelectric machine as recited in claim 1, wherein each of said end bells includes a central aperture having substantially the same diameter as said central opening and being axially aligned with said central opening.

6. A dynamoelectric machine as recited in claim 1, wherein each of said end bells includes a longitudinally extending peripheral flange sized to form an interference fit with said stator stack.

7. A dynamoelectric machine as recited in claim 1, further comprising:

a stator winding passing through said stator stack, said winding including end turns disposed on opposite sides of said stator stack; and wherein said cleats extend longitudinally beyond said end turns.

* * * * *

UNITED STATES PATENT AND TRADEMARK OFFICE
CERTIFICATE OF CORRECTION

PATENT NO. : 4,603,273
DATED : July 29, 1986
INVENTOR(S) : George M. McDonald

It is certified that error appears in the above-identified patent and that said Letters Patent is hereby corrected as shown below:

Col.3, line 16, cancel "pre ent" and substitute therefor ---prevent---; Col. 3, line 22, cancel "tab 4" and substitute therefor ---tab 64---; Col. 3, line 28, cancel the second "the" and substitute therefor ---this---; Col 3, line 39, cancel "pluraity" and substitute therefor ---plurality---; Col. 4, line 26, cancel "cleat" and substitute therefor ---cleats---; Col. 4, line 33, after "bells" insert ---,--- (comma); Col. 4, line 42, cancel "fo" and substitute therefor ---of---.

Signed and Sealed this

Twelfth Day of July, 1988

Attest:

DONALD J. QUIGG

Attesting Officer

Commissioner of Patents and Trademarks